H. C. SMITH.
TWINE CUTTER.
APPLICATION FILED MAR. 30, 1915.

1,176,930.

Patented Mar. 28, 1916.

Witnesses
Arthur K. Moore
Harry M. Test

Inventor
H. C. Smith
By
Attorneys

UNITED STATES PATENT OFFICE.

HIRAM C. SMITH, OF ST. CLAIR, MISSOURI, ASSIGNOR OF ONE-HALF TO C. W. KLAYER, OF ST. CLAIR, MISSOURI.

TWINE-CUTTER.

1,176,930.  Specification of Letters Patent.  Patented Mar. 28, 1916.

Application filed March 30, 1915. Serial No. 18,108.

*To all whom it may concern:*

Be it known that I, HIRAM C. SMITH, a citizen of the United States, residing at St. Clair, in the county of Franklin, State of Missouri, have invented certain new and useful Improvements in Twine-Cutters; and I do hereby declare the following to be a full, clear, and exact description of the invention, such as will enable others skilled in the art to which it appertains to make and use the same.

This invention relates to an improvement in twine cutters.

The principal object of this invention is to provide, as an article of manufacture, a twine cutting implement formed from a single length of steel wire which is centrally bent to form an elongated double hand loop, with one end of the wire rebent to form a knife for severing the binding twine with which corn shocks and similar bundles are bound at the time of harvesting.

Another object of the invention is to provide an implement for the purpose described which is capable of being employed without the use of gloves, which may be carried in the operator's pocket without danger, and which is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim may be resorted to without departing from the spirit or sacrificing any of the advantages of the invention.

Figure 1:
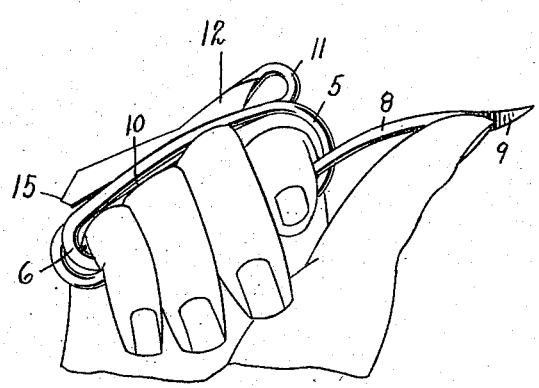
Figure 2:
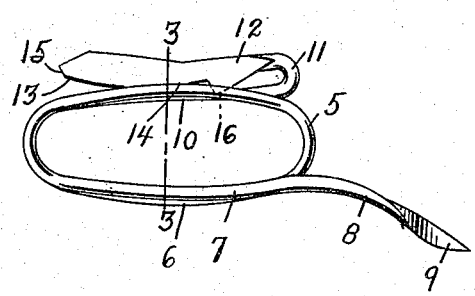
Figure 3:
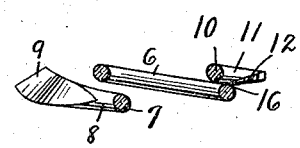

In the drawing: Figure 1 is a perspective view showing the invention applied to a hand, Fig. 2 is a side elevation of the invention, and Fig. 3 is a view taken on the line 3—3 of Fig. 2, looking in the direction of the husking pin.

Like reference numerals designate corresponding parts in all the figures of the drawing.

Referring to the drawing, the implement is formed from a single length of steel wire 5, which is centrally bent to form an elongated hand receiving loop 6. The end portion 10 of the wire is extended along and within the loop 6 and is rebent, as at 11, to form an offset extreme end portion 12. This extreme end portion 12 is flattened to form a knife, the cutting edge 13 thereof being centrally formed with a hump 14 which is disposed intermediate the respective side of the loop 6 and the end portion 10 and in spaced relation to both. The extreme end of the knife is pointed, as at 15, and formed on the knife on the opposite side of the point from the hump 14 is an inwardly extending projection 16 which constitutes a stop, and which projects between the respective side of the loop 6 and the end portion 10.

In practice, by means of this implement the operator can readily cut the binding cords of corn shocks or other grain bundles, the point 15 of the knife being inserted under the cord and the knife drawn transversely thereof to quickly cut the same, severing of the cord being facilitated by the hump 14. Should, however, the cord for any reason pass beyond the hump 14, the stop 16 will prevent further movement of the implement, and thereby obviate any trouble which might be caused by the cord passing beyond the knife.

It will furthermore be observed that by the construction of this implement as above described, the same may be readily carried in the operator's pocket without any danger, or when the invention is in use, the position of the knife 12 will render the same incapable of accidentally injuring any person.

What is claimed is:

A twine cutting implement formed from a single length of steel wire which is centrally bent to form an elongated hand loop, one end portion of the wire extending along the side of the said loop and having its extreme end portion rebent and flattened, the inner edge thereof being sharpened and disposed intermediate the loop and the first named end portion of the loop, and a projection extending inwardly from the inner end of the knife to form a stop, said stop extending between the loop and the adjacent end portion thereof.

In testimony whereof, I affix my signature, in the presence of two witnesses.

HIRAM C. SMITH.

Witnesses:
D. M. HIBBARD,
MAUD GOULOT.

Copies of this patent may be obtained for five cents each, by addressing the "Commissioner of Patents, Washington, D. C."